United States Patent
Si et al.

(10) Patent No.: US 11,743,903 B2
(45) Date of Patent: Aug. 29, 2023

(54) TRANSMISSION METHOD, USER EQUIPMENT AND BASE STATION

(71) Applicant: CHINA ACADEMY OF TELECOMMUNICATIONS TECHNOLOGY, Beijing (CN)

(72) Inventors: Qianqian Si, Beijing (CN); Xuejuan Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 308 days.

(21) Appl. No.: 16/772,707

(22) PCT Filed: Nov. 20, 2018

(86) PCT No.: PCT/CN2018/116428
§ 371 (c)(1),
(2) Date: Jun. 12, 2020

(87) PCT Pub. No.: WO2019/114504
PCT Pub. Date: Jun. 20, 2019

(65) Prior Publication Data
US 2020/0322928 A1    Oct. 8, 2020

(30) Foreign Application Priority Data
Dec. 13, 2017    (CN) .......................... 201711330017.3

(51) Int. Cl.
*H04W 72/21*    (2023.01)
*H04W 72/23*    (2023.01)
(Continued)

(52) U.S. Cl.
CPC .......... *H04W 72/23* (2023.01); *H04L 1/1812* (2013.01); *H04L 5/0053* (2013.01); *H04W 72/21* (2023.01)

(58) Field of Classification Search
CPC combination set(s) only.
See application file for complete search history.

(56) References Cited

U.S. PATENT DOCUMENTS

| 10,020,924 B2 * | 7/2018 | Kang | .................. H04W 74/006 |
| 10,965,426 B2 * | 3/2021 | Lee | ..................... H04W 72/042 |

(Continued)

FOREIGN PATENT DOCUMENTS

| CN | 101917259 A | 12/2010 |
| CN | 101917765 A | 12/2010 |

(Continued)

OTHER PUBLICATIONS

First Office Action and Search Report from CN app. No. 201711330017.3, dated Mar. 26, 2020, with English translation provided by Global Dossier.

(Continued)

*Primary Examiner* — Hanh N Nguyen
(74) *Attorney, Agent, or Firm* — Ladas & Parry, LLP (57) ABSTRACT

A transmission method, a terminal and a base station are provided, thereby solving the problem that there is no specific method in the 5G system for distinguishing whether one DCI triggers the transmission of data and control information at the same time or triggers the transmission of control information only. The transmission includes receiving DCI, wherein the DCI comprises indication information of N bits, the indication information of N bits is used to indicate whether the DCI triggers transmission of data, and N is an integer greater than or equal to 1; and performing transmission based on the indication information in the DCI.

9 Claims, 3 Drawing Sheets

(51) Int. Cl.
*H04L 1/1812* (2023.01)
*H04L 5/00* (2006.01)

(56) References Cited

U.S. PATENT DOCUMENTS

| | | | |
|---|---|---|---|
| 2012/0039199 A1* | 2/2012 | Chen | H04L 5/0053 370/252 |
| 2015/0103774 A1* | 4/2015 | Nagata | H04B 7/0626 370/329 |
| 2016/0021658 A1 | 1/2016 | Chen et al. | |
| 2016/0037492 A1 | 2/2016 | Xu et al. | |
| 2017/0223675 A1* | 8/2017 | Dinan | H04W 72/042 |
| 2018/0083806 A1 | 3/2018 | Xing et al. | |
| 2018/0332566 A1* | 11/2018 | You | H04L 1/0079 |
| 2019/0081765 A1 | 3/2019 | Si et al. | |
| 2020/0336186 A1* | 10/2020 | Chen | H04L 5/0057 |
| 2020/0403678 A1* | 12/2020 | Shi | H04W 72/1263 |

FOREIGN PATENT DOCUMENTS

| | | |
|---|---|---|
| CN | 102006624 A | 4/2011 |
| CN | 102340800 A | 2/2012 |
| CN | 106455092 A | 2/2017 |
| CN | 107295655 A | 10/2017 |
| EP | 2733983 A2 | 5/2014 |
| EP | 3253108 A1 | 12/2017 |
| TW | 201703448 A | 1/2017 |
| WO | 2012019412 A1 | 2/2012 |
| WO | 2016/122846 A1 | 8/2016 |

OTHER PUBLICATIONS

Office Action from TW app. No. 107142613, dated Sep. 17, 2020, with machine English translation.
ISR by International Searching Authority from PCT/CN2018/116428, dated Jan. 18, 2019, with English translation from WIPO.
Written Opinion of the International Searching Authority from PCT/CN2018/116428, dated Jan. 18, 2019, with English translation from WIPO.
International Preliminary Report on Patentability from PCT/CN2018/116428, dated Jun. 16, 2020, with English translation from WIPO.
Alcatel-Lucent Shanghai Bell, Alcatel-Lucent, "Further Discussions on UL Transmission Modes and DCI Format Designs", R1-105207, 3GPP TSG RAN WG1 Meeting #62bis, Xi'an, China, Oct. 11-15, 2010, all pages.
Notice of Reasons for Refusal from JP app. No. 2020-532606, dated Aug. 17, 2021, with English translation from Global Dossier, all pages.
NTT Docomo, Inc., "DCI contents and formats", R1-1720814, 3GPP TSG RAN WG1 Meeting 91, Reno, USA, Nov. 27-Dec. 1, 2017, all pages.
Notification of Reasons for Refusal from KR app. No. 10-2020-7020054, dated Nov. 16, 2021, with English translation from Global Dossier, all pages.
Office Action for corresponding European Patent Application 18 889 672.4 issued by the European Patent Office dated Feb. 21, 2022.
Office Action issued for corresponding European Patent Application No. 18889672.4 dated Jan. 12, 2023.

* cited by examiner

TRANSMISSION METHOD, USER EQUIPMENT AND BASE STATION

CROSS-REFERENCE TO RELATED APPLICATIONS

The present application is the U.S. national phase of PCT Application No. PCT/CN2018/116428 filed on Nov. 20, 2018, which claims a priority to the Chinese patent application No. 201711330017.3 filed on Dec. 13, 2017, the disclosures of which are incorporated herein by reference in their entireties.

TECHNICAL FIELD

The present disclosure relates to the field of communication technology, in particular to a transmission method, a user equipment (UE) and a base station.

BACKGROUND

In a Long Term Evolution (LTE) wireless communication system, aperiodic channel state information (CSI) is transmitted through a Physical UplinkShared Channel (PUSCH), and an eNodeB triggers a UE to report aperiodic CSI by scheduling Downlink Control Information (DCI) of uplink data. There is an information field in the DCI for scheduling uplink data, the information filed is used for triggering an aperiodic CSI report. When the information field indicates that the UE needs to report the aperiodic CSI, the UE reports the aperiodic CSI through the PUSCH at a predefined location.

In the LTE system, control information (including hybrid automatic repeat request acknowledgements HARQ-ACK and CSI) and uplink shared channel UL-SCH data are supported to be multiplexed and transmitted on the PUSCH, or only control information is transmitted on the PUSCH. The eNodeB indicates that only control information is transmitted on the PUSCH by setting certain information fields in the DCI to a special state. The 3GPP protocol TS36.213e40 specifies in section 8.6.2 that there is no transmission of the UL-SCH transport block TB and that there are only different conditions for the transmission of the control information on the PUSCH. For example, one possible case is to use DCI format 0 and the modulation and coding scheme MCS level is 29, or when DCI format 4 is used and only one TB is enabled and the enabled TB corresponds to MCS level 29 and the quantity of transport layers is 1, the information field for triggering CSI in DCI is 1 bit and is set to trigger aperiodic CSI report, and the quantity of PRBs is less than or equal to 4, it is considered that only transmission of control information exists on PUSCH scheduled by the DCI.

As mobile communication service requirements evolve, organizations such as the International Telecommunication Union (ITU) and 3GPP begin to study new wireless communication systems (e.g., 5G NR, 5 Generation New RAT). In the NR, on one hand, there may be no index or no reserved index for indicating the RV version in the newly defined MCS table, and therefore the manner in which only control information is transmitted on the PUSCH in LTE may not be applicable to the NR. On the other hand, the NR supports that the aperiodic CSI is triggered through the downlink DCI for transmission on short PUCCH, but there is no specific method in the 5G system to distinguish whether one DCI triggers the transmission of the control information and the data at the same time or only triggers the transmission of the control information, that is, there is no relevant solution on how to distinguish whether one DCI triggers the transmission of data.

SUMMARY

The present disclosure provides a transmission method, a terminal and a base station, so as to solve the problem that there is no specific solution to distinguish whether one DCI triggers the transmission of data.

In a first aspect, an embodiment of the present disclosure provides a transmission method, including: receiving downlink control information (DCI), wherein the DCI comprises indication information of N bits, the indication information of N bits is used to indicate whether the DCI triggers transmission of data, and N is an integer greater than or equal to 1; and performing transmission based on the indication information in the DCI.

In some embodiment of the present disclosure, the DCI further comprises an aperiodic channel state information (CSI) indication field of X bits, the aperiodic CSI indication field of X bits is used to indicate whether transmission of the aperiodic CSI is triggered, and X is an integer greater than or equal to 1.

In some embodiment of the present disclosure, a situation that the aperiodic CSI indication field of X bits indicates that the transmission of the aperiodic CSI is not triggered and a situation that the indication information of N bits indicates that the transmission of the data is not triggered cannot coexist.

In some embodiment of the present disclosure, N is 1.

In some embodiment of the present disclosure, when the indication information of 1 bit is 0, it indicates that the transmission of the data is not triggered, and when the indication information of 1 bit is 1, it indicates that the transmission of the data is triggered; or when the indication information of 1 bit is 0, it indicates that transmission of data is triggered, and when the indication information of 1 bit is 1, it indicates that transmission of data is not triggered.

In some embodiment of the present disclosure, the DCI is uplink DCI for scheduling uplink transmission; the step of performing transmission based on the indication information in the DCI includes: if the uplink DCI triggers the transmission of data, the uplink DCI comprises an aperiodic CSI indication field of X bits, and the aperiodic CSI indication field is set to a state in which transmission of aperiodic CSI is not triggered, sending uplink shared channel (UL-SCH) data information on a physical uplink shared channel (PUSCH) scheduled by the uplink DCI; if the uplink DCI triggers the transmission of data, the uplink DCI includes the aperiodic CSI indication field of X bits, and the aperiodic CSI indication field is set to a state in which the transmission of aperiodic CSI is triggered, sending UL-SCH data information and aperiodic CSI on the PUSCH scheduled by the uplink DCI; and if the uplink DCI does not trigger the transmission of data, the uplink DCI includes the aperiodic CSI indication field of X bits, and the aperiodic CSI indication field is set to a state in which the transmission of aperiodic CSI is triggered, sending the aperiodic CSI on the PUSCH scheduled by the DCI.

In some embodiment of the present disclosure, the DCI is downlink DCI for scheduling downlink transmission; the step of performing transmission based on the indication information in the DCI includes: if the downlink DCI triggers the transmission of data, receiving downlink data on a physical downlink shared channel (PDSCH) scheduled by the downlink DCI, and determining whether to report aperiodic CSI based on an aperiodic CSI indication field of X bits included in the DCI; and if the downlink DCI does not trigger the transmission of data, the DCI includes an aperiodic CSI indication field of X bits, and the aperiodic CSI indication field is set to a state in which the transmission of aperiodic CSI is triggered, sending the aperiodic CSI on a physical uplink control channel (PUCCH) scheduled by the downlink DCI.

In some embodiment of the present disclosure, the step of determining whether to report aperiodic CSI based on an aperiodic CSI indication field of X bits included in the DCI includes: if the aperiodic CSI indication field instructs to report the aperiodic CSI, reporting the aperiodic CSI and feedback information of a hybrid automatic repeat request (HARQ) corresponding to the PDSCH scheduled by the downlink DCI.

The present disclosure further provides a transmission method including: sending downlink control information (DCI), wherein the DCI comprises indication information of N bits, the indication information of N bits is used to indicate whether the DCI triggers transmission of data, and N is an integer greater than or equal to 1; and performing transmission based on the indication information in the DCI.

In some embodiment of the present disclosure, the DCI further comprises an aperiodic channel state information (CSI) indication field of X bits, the aperiodic CSI indication field of X bits is used to indicate whether transmission of the aperiodic CSI is triggered, and X is an integer greater than or equal to 1.

In some embodiment of the present disclosure, a situation that the aperiodic CSI indication field of X bits indicates that the transmission of the aperiodic CSI is not triggered and a situation that the indication information of N bits indicates that the transmission of the data is not triggered cannot coexist.

In some embodiment of the present disclosure, N is 1.

In some embodiment of the present disclosure, when the indication information of 1 bit is 0, it indicates that the transmission of the data is not triggered, and when the indication information of 1 bit is 1, it indicates that the transmission of the data is triggered; or when the indication information of 1 bit is 0, it indicates that transmission of data is triggered, and when the indication information of 1 bit is 1, it indicates that transmission of data is not triggered.

In some embodiment of the present disclosure, the DCI is uplink DCI for scheduling uplink transmission; the step of performing transmission based on the indication information in the DCI includes: if the uplink DCI triggers the transmission of data, the uplink DCI comprises an aperiodic CSI indication field of X bits, and the aperiodic CSI indication field is set to a state in which transmission of aperiodic CSI is not triggered, receiving uplink shared channel (UL-SCH) data information on a physical uplink shared channel (PUSCH) scheduled by the uplink DCI; if the uplink DCI triggers the transmission of data, the uplink DCI includes the aperiodic CSI indication field of X bits, and the aperiodic CSI indication field is set to a state in which the transmission of aperiodic CSI is triggered, receiving UL-SCH data information and aperiodic CSI on the PUSCH scheduled by the uplink DCI; and if the uplink DCI does not trigger the transmission of data, the uplink DCI includes the aperiodic CSI indication field of X bits, and the aperiodic CSI indication field is set to a state in which the transmission of aperiodic CSI is triggered, receiving the aperiodic CSI on the PUSCH scheduled by the DCI.

In some embodiment of the present disclosure, the DCI is downlink DCI for scheduling downlink transmission; the step of performing transmission based on the indication information in the DCI includes: if the downlink DCI triggers the transmission of data, sending downlink data on a physical downlink shared channel (PDSCH) scheduled by the downlink DCI; and if the downlink DCI does not trigger the transmission of data, the DCI includes an aperiodic CSI indication field of X bits, and the aperiodic CSI indication field is set to a state in which the transmission of aperiodic CSI is triggered, receiving the aperiodic CSI on a physical uplink control channel (PUCCH) scheduled by the downlink DCI.

The present disclosure further includes a terminal including a transceiver, a memory, a processor, and a program stored on the memory and executed by the processor, to implement the steps of: receiving downlink control information (DCI) by the transceiver, wherein the DCI comprises indication information of N bits, the indication information of N bits is used to indicate whether the DCI triggers transmission of data, and N is an integer greater than or equal to 1; and performing transmission based on the indication information in the DCI.

In some embodiment of the present disclosure, the DCI further comprises an aperiodic channel state information (CSI) indication field of X bits, the aperiodic CSI indication field of X bits is used to indicate whether transmission of the aperiodic CSI is triggered, and X is an integer greater than or equal to 1.

In some embodiment of the present disclosure, a situation that the aperiodic CSI indication field of X bits indicates that the transmission of the aperiodic CSI is not triggered and a situation that the indication information of N bits indicates that the transmission of the data is not triggered cannot coexist.

In some embodiment of the present disclosure, N is 1.

In some embodiment of the present disclosure, when the indication information of 1 bit is 0, it indicates that the transmission of the data is not triggered, and when the indication information of 1 bit is 1, it indicates that the transmission of the data is triggered; or when the indication information of 1 bit is 0, it indicates that transmission of data is triggered, and when the indication information of 1 bit is 1, it indicates that transmission of data is not triggered.

In some embodiment of the present disclosure, the DCI is uplink DCI for scheduling uplink transmission; when executing the program, the processor further performs the following steps: if the uplink DCI triggers the transmission of data, the uplink DCI comprises an aperiodic CSI indication field of X bits, and the aperiodic CSI indication field is set to a state in which transmission of aperiodic CSI is not triggered, sending uplink shared channel (UL-SCH) data information on a physical uplink shared channel (PUSCH) scheduled by the uplink DCI; if the uplink DCI triggers the transmission of data, the uplink DCI includes the aperiodic CSI indication field of X bits, and the aperiodic CSI indication field is set to a state in which the transmission of aperiodic CSI is triggered, sending UL-SCH data information and aperiodic CSI on the PUSCH scheduled by the uplink DCI; and if the uplink DCI does not trigger the transmission of data, the uplink DCI includes the aperiodic CSI indication field of X bits, and the aperiodic CSI indication field is set to a state in which the transmission of aperiodic CSI is triggered, sending the aperiodic CSI on the PUSCH scheduled by the DCI.

In some embodiment of the present disclosure, the DCI is downlink DCI for scheduling downlink transmission; when executing the program, the processor further performs the following steps: if the downlink DCI triggers the transmission of data, receiving downlink data on a physical downlink shared channel (PDSCH) scheduled by the downlink DCI, and determining whether to report aperiodic CSI based on an aperiodic CSI indication field of X bits included in the DCI; and if the downlink DCI does not trigger the transmission of data, the DCI includes an aperiodic CSI indication field of X bits, and the aperiodic CSI indication field is set to a state in which the transmission of aperiodic CSI is triggered, sending the aperiodic CSI on a physical uplink control channel (PUCCH) scheduled by the downlink DCI.

In some embodiment of the present disclosure, when executing the program, the processor is further configured to: if the aperiodic CSI indication field instructs to report the aperiodic CSI, report the aperiodic CSI and feedback information of a hybrid automatic repeat request (HARQ) corresponding to the PDSCH scheduled by the downlink DCI.

The present disclosure further provides a computer-readable storage medium having stored thereon a program, when the program is executed by a processor to implement the steps of the above transmission method.

The present disclosure further provides a base station including a transceiver, a memory, a processor, and a program stored on the memory and executed by the processor, when executing the program, the processor implements the steps of: sending downlink control information (DCI), wherein the DCI comprises indication information of N bits, the indication information of N bits is used to indicate whether the DCI triggers transmission of data, and N is an integer greater than or equal to 1; and performing transmission based on the indication information in the DCI.

In some embodiment of the present disclosure, the DCI further comprises an aperiodic channel state information (CSI) indication field of X bits, the aperiodic CSI indication field of X bits is used to indicate whether transmission of the aperiodic CSI is triggered, and X is an integer greater than or equal to 1.

In some embodiment of the present disclosure, a situation that the aperiodic CSI indication field of X bits indicates that the transmission of the aperiodic CSI is not triggered and a situation that the indication information of N bits indicates that the transmission of the data is not triggered cannot coexist.

In some embodiment of the present disclosure, N is 1.

In some embodiment of the present disclosure, when the indication information of 1 bit is 0, it indicates that the transmission of the data is not triggered, and when the indication information of 1 bit is 1, it indicates that the transmission of the data is triggered; or when the indication information of 1 bit is 0, it indicates that transmission of data is triggered, and when the indication information of 1 bit is 1, it indicates that transmission of data is not triggered.

In some embodiment of the present disclosure, the DCI is uplink DCI for scheduling uplink transmission; when executing the program, the processor further performs the following steps: if the uplink DCI triggers the transmission of data, the uplink DCI comprises an aperiodic CSI indication field of X bits, and the aperiodic CSI indication field is set to a state in which transmission of aperiodic CSI is not triggered, receiving uplink shared channel (UL-SCH) data information on a physical uplink shared channel (PUSCH) scheduled by the uplink DCI; if the uplink DCI triggers the transmission of data, the uplink DCI includes the aperiodic CSI indication field of X bits, and the aperiodic CSI indication field is set to a state in which the transmission of aperiodic CSI is triggered, receiving UL-SCH data information and aperiodic CSI on the PUSCH scheduled by the uplink DCI; and if the uplink DCI does not trigger the transmission of data, the uplink DCI includes the aperiodic CSI indication field of X bits, and the aperiodic CSI indication field is set to a state in which the transmission of aperiodic CSI is triggered, receiving the aperiodic CSI on the PUSCH scheduled by the DCI.

In some embodiment of the present disclosure, the DCI is downlink DCI for scheduling downlink transmission; when executing the program, the processor further performs the following steps: if the downlink DCI triggers the transmission of data, sending downlink data on a physical downlink shared channel (PDSCH) scheduled by the downlink DCI through the transceiver; and if the downlink DCI does not trigger the transmission of data, the DCI includes an aperiodic CSI indication field of X bits, and the aperiodic CSI indication field is set to a state in which the transmission of aperiodic CSI is triggered, receiving the aperiodic CSI on a physical uplink control channel (PUCCH) scheduled by the downlink DCI through the transceiver.

The present disclosure further provides a computer-readable storage medium having stored thereon a program, when the program is executed by a processor to implement the steps of the above transmission method.

The present disclosure further provides a terminal including: a receiving module, configured to receive downlink control information (DCI), wherein the DCI comprises indication information of N bits, the indication information of N bits is used to indicate whether the DCI triggers transmission of data, and N is an integer greater than or equal to 1; and a first transmission module, configured to perform transmission based on the indication information in the DCI.

The present disclosure further provides a base station, including: a sending module, configured to send downlink control information (DCI), wherein the DCI comprises indication information of N bits, the indication information of N bits is used to indicate whether the DCI triggers transmission of data, and N is an integer greater than or equal to 1; and a second transmission module, configured to perform transmission based on the indication information in the DCI.

An embodiment of the present disclosure has the beneficial effect as follows.

In the technical solution of the embodiment of the present disclosure, indication information of N bits included in the DCI is used to indicate whether the DCI triggers transmission of data, so that the transmission end may learn, based on the indication information, whether the DCI triggers the transmission of data, thereby solving the problem in the 5G system that there is no specific method to distinguish whether one DCI triggers the transmission of data.

DETAILED DESCRIPTION

In order that the technical problems, technical solutions, and advantages to be solved by the present disclosure may be made clearer, reference will now be made in detail to the following detailed description taken in conjunction with the accompanying drawings.

Figure 1:
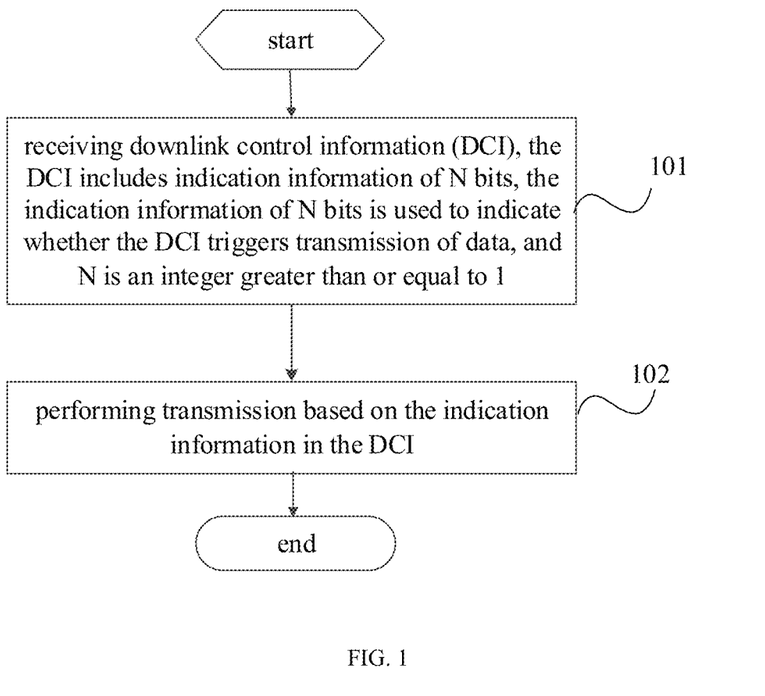
FIG. 1 is a flowchart of a transmission method according to some embodiments of the present disclosure.

As shown in FIG. 1, an embodiment of the present disclosure provides a transmission method applied to a terminal, the transmission method includes the following steps.

Step 101: receiving downlink control information (DCI), where the DCI includes indication information of N bits, the indication information of N bits is used to indicate whether the DCI triggers transmission of data, and N is an integer greater than or equal to 1.

Optionally, N is 1. In an embodiment of the present disclosure, whether the DCI triggers transmission of data is indicated by the indication information of 1 bit included in the DCI.

Specifically, when the indication information of 1 bit is 0, it is used to indicate that transmission of data is not triggered, and when the indication information of 1 bit is 1, it is used to indicate that transmission of data is triggered.

Alternatively, when the indication information of 1 bit is 0, it is used to indicate that transmission of data is triggered, and when the indication information of 1 bit is 1, it is used to indicate that transmission of data is not triggered.

Step 102: performing transmission based on the indication information in the DCI.

According to the transmission method of the embodiment of the present disclosure, whether the DCI triggers the transmission of data is indicated by the indication information of N bits included in the DCI, so that the transmission end can learn, according to the indication information, whether the DCI triggers the transmission of data, thereby solving the problem that there is no specific method for distinguishing whether the DCI triggers the transmission of data in the 5G system.

Optionally, the DCI includes, in addition to the indication information of N bits, an aperiodic channel state information CSI indication field of X bits, where the aperiodic CSI indication field of X bits is used to indicate whether the transmission of the aperiodic CSI is triggered, and X is an integer greater than or equal to 1.

The situation that the aperiodic channel state information CSI indication field of the X bits indicates that the transmission of the aperiodic CSI is not triggered, and the situation that the indication information of the N bits indicates that the transmission of the data is not triggered cannot coexist. That is, when the indication information of the 1 bit in the DCI indicates that the transmission of the data is not triggered, the aperiodic CSI indication field of the X bit must indicate that the transmission of the aperiodic CSI is triggered.

Further, the DCI includes uplink DCI for scheduling uplink transmission and downlink DCI for scheduling downlink transmission, which are respectively described below.

When the DCI is uplink DCI for scheduling uplink transmission, the step 102 of performing transmission based on the indication information in the DCI includes: if the uplink DCI triggers the transmission of data, the uplink DCI includes the aperiodic CSI indication field of X bits, and the indication field is set to a state in which the aperiodic CSI transmission is not triggered, sending uplink shared channel UL-SCH data information on a physical uplink shared channel PUSCH scheduled by the uplink DCI.

Here, the terminal may transmit the feedback information of the periodic CSI and/or the hybrid automatic repeat request HARQ while sending the UL-SCH data information on the PUSCH scheduled by the uplink DCI. The HARQ feedback information includes hybrid automatic repeat request acknowledgement HARQ-ACK information and hybrid automatic repeat request non-acknowledgement HARQ-NACK information.

If the uplink DCI triggers the transmission of data, the uplink DCI includes aperiodic CSI indication field of X bits, and the indication field is set to a state in which transmission of aperiodic CSI is triggered, sending the UL-SCH data information and the aperiodic CSI on the PUSCH scheduled by the uplink DCI.

Here, when the terminal transmits the UL-SCH data information and the aperiodic CSI on the PUSCH scheduled by the uplink DCI, the terminal may further transmit the feedback information of the HARQ.

If the uplink DCI does not trigger the transmission of data, the uplink DCI includes the aperiodic CSI indication field of X bits, and the indication field is set to a state of triggering the transmission of aperiodic CSI, sending the aperiodic CSI on the PUSCH scheduled by the DCI.

Here, when the terminal transmits the aperiodic CSI on the PUSCH scheduled by the DCI, the terminal may further transmit the feedback information of the HARQ.

Assuming an uplink DCI includes one bit of indication information and one bit of aperiodic CSI indication field, when the indication information of the one bit is 0, it indicates that transmission of data is not triggered, and when the indication information of the one bit is 1, it indicates that transmission of data is triggered. When the indication field of the 1 bit is 0, it indicates that the transmission of the aperiodic CSI is not triggered, and the indication information of the one bit is 1, it indicates that the transmission of the aperiodic CSI is triggered, the indication information of the 1 bit and the aperiodic CSI indication field of the 1 bit cannot be set to 0 at the same time.

Case A1: the indication information of the 1 bit is 0, and the aperiodic CSI indication field of the 1 bit is 1. The terminal reports the aperiodic CSI through the PUSCH based on the indication of the DCI. If the HARQ-ACK needs to be fed back at the reporting location and the terminal does not support simultaneous transmission of the PUCCH and the PUSCH, the HARQ-ACK is multiplexed on the PUSCH and transmitted together with the aperiodic CSI.

Case B1: The indication information of the 1 bit is 1, and the aperiodic CSI indication field of the 1 bit is 0. The terminal transmits data through the PUSCH based on the indication of the DCI. If the HARQ-ACK and/or the periodic CSI need to be fed back at the reporting location, and the terminal does not support the simultaneous transmission of the PUCCH and the PUSCH, the HARQ-ACK and/or the periodic CSI is multiplexed on the PUSCH and transmitted together with the aperiodic CSI.

Case C1: The indication information of the 1 bit is 1, and the aperiodic CSI indication field of the 1 bit is 1. The terminal transmits the data and reports the aperiodic CSI through the PUSCH based on the indication of the DCI. If the HARQ-ACK needs to be fed back at the reporting location and the terminal does not support the simultaneous transmission of the PUCCH and the PUSCH, the HARQ-ACK is multiplexed on the PUSCH and transmitted together with the data and the aperiodic CSI.

When the DCI is downlink DCI for scheduling downlink transmission, the step 102 of performing transmission based on the indication information in the DCI includes: if the downlink DCI triggers transmission of data, downlink data is received on a physical downlink shared channel PDSCH scheduled by the downlink DCI, and it is determined whether to report aperiodic CSI based on an aperiodic CSI indication field of X bits included in the DCI.

Here, if it is determined that the aperiodic CSI needs to be reported based on the aperiodic CSI indication field of the DCI, the feedback information of the HARQ corresponding to the PDSCH scheduled by the DCI may be reported when the aperiodic CSI is reported, for example, the HARQ-ACK corresponding to the PDSCH scheduled by the DCI is reported.

If the downlink DCI does not trigger the transmission of data, the DCI includes an aperiodic CSI indication field of X bits, and the indication field is set to a state in which the aperiodic CSI transmission is triggered, the aperiodic CSI is transmitted on the PUCCH scheduled by the downlink DCI.

The step of determining whether to report the aperiodic CSI based on the aperiodic CSI indication field of the X bits included in the DCI includes: if the aperiodic CSI indication field indicates to report the aperiodic CSI, the aperiodic CSI and feedback information of the HARQ corresponding to the PDSCH scheduled by the downlink DCI are reported.

Assuming a downlink DCI includes one bit of indication information and one bit of aperiodic CSI indication field, when the indication information of the one bit is 0, it indicates that transmission of data is not triggered, and when the indication information of the one bit is 1, it indicates that transmission of data is triggered. When the aperiodic CSI indication field of 1 bit is 0, it indicates that the transmission of the aperiodic CSI is not triggered, and when the aperiodic CSI indication field of 1 bit is 1, it indicates that the transmission of the aperiodic CSI is triggered. Then, the indication information of 1 bit and the aperiodic CSI indication field of 1 bit cannot be set to 0 at the same time.

Case A2: The indication information of the 1 bit is 0, and the aperiodic CSI indication field of the 1 bit is 1. The terminal reports the aperiodic CSI through the short PUCCH based on the indication of the DCI.

Case B2: The indication information of the 1 bit is 1, and the aperiodic CSI indication field of the 1 bit is 0. The terminal receives data through the PDSCH based on the instruction of the DCI.

Case C2: The indication information of the 1 bit is 1, and the aperiodic CSI indication field of the 1 bit is 1. The terminal receives data through the PDSCH based on the indication of the DCI, and reports the aperiodic CSI through the short PUCCH. The terminal simultaneously reports the HARQ-ACK feedback information and the aperiodic CSI corresponding to the PDSCH scheduled by the DCI in the short PUCCH.

According to the transmission method of the embodiment of the present disclosure, whether the DCI triggers the transmission of data is indicated by the indication information of N bits included in the DCI, so that the transmission end can learn, based on the indication information, whether the DCI triggers the transmission of data, thereby solving the problem that there is no specific method for distinguishing whether the DCI triggers the transmission of data in the 5G system.

Figure 2:
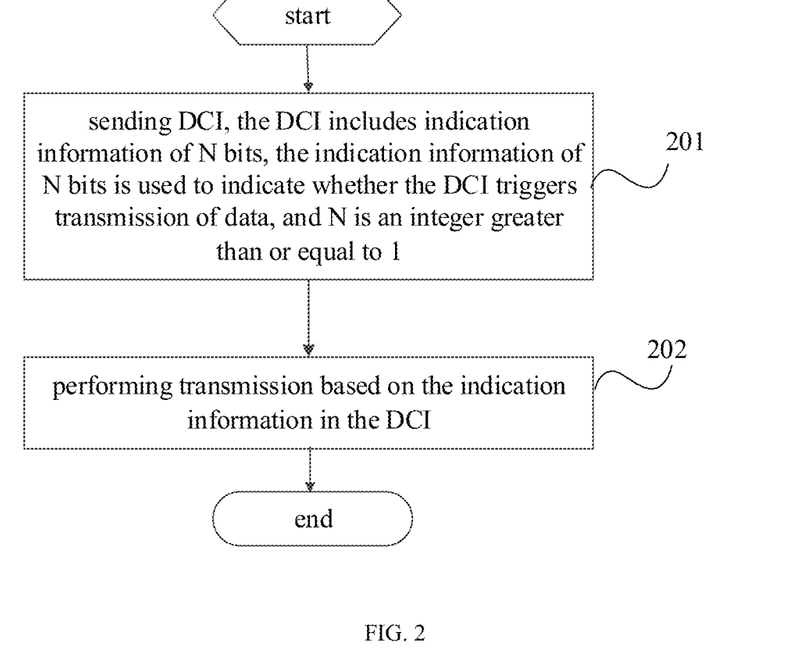
FIG. 2 is another flowchart of a transmission method according to some embodiments of the present disclosure.

As shown in FIG. 2, an embodiment of the present disclosure further provides a transmission method applied to a base station. The transmission method includes the following steps.

Step 201: sending DCI, where the DCI includes indication information of N bits, the indication information of N bits is used to indicate whether the DCI triggers transmission of data, and N is an integer greater than or equal to 1.

Optionally, N is 1. In this embodiment of the present disclosure, whether the DCI triggers transmission of data is indicated by the indication information of 1 bit included in the DCI.

Specifically, when the indication information of 1 bit is 0, it is used to indicate that transmission of data is not triggered, and when the indication information of 1 bit is 1, it is used to indicate that transmission of data is triggered.

Alternatively, when the indication information of 1 bit is 0, it is used to indicate that transmission of data is triggered, and when the indication information of 1 bit is 1, it is used to indicate that transmission of data is not triggered.

Step 202: performing transmission based on the indication information in the DCI.

Here, the transmission method applied to the terminal side is a method corresponding to the transmission method applied to the base station side. Since the transmission method has been described in detail on the base station side, details are not described herein.

According to the transmission method of the embodiment of the present disclosure, whether the DCI triggers the transmission of data is indicated by the indication information of N bits included in the DCI, so that the transmission end can learn, based on the indication information, whether the DCI triggers the transmission of data, thereby solving the problem that there is no specific method for distinguishing whether the DCI triggers the transmission of data in the 5G system.

Optionally, the DCI further includes an aperiodic CSI indication field of X bits, the aperiodic CSI indication field of X bits is used to indicate whether transmission of the aperiodic CSI is triggered, and X is an integer greater than or equal to 1.

Optionally, the situation that the aperiodic CSI indication field of X bits indicates that the transmission of the aperiodic CSI is not triggered and the situation that the indication information of N bits indicates that the transmission of the data is not triggered cannot coexist.

Optionally, the DCI is uplink DCI for scheduling uplink transmission.

The step of performing transmission based on the indication information in the DCI includes: if the uplink DCI triggers transmission of data, the uplink DCI includes the aperiodic CSI indication field of X bits, and the indication field is set to a state in which the aperiodic CSI transmission is not triggered, receiving UL-SCH data information on a PUSCH scheduled by the uplink DCI; if the uplink DCI triggers transmission of data, the uplink DCI includes the aperiodic CSI indication field of X bits, and the indication field is set to a state in which the transmission of aperiodic CSI is triggered, receiving UL-SCH data information and aperiodic CSI on a PUSCH scheduled by the uplink DCI; and if the DCI does not trigger the transmission of data, the uplink DCI includes an the aperiodic CSI indication field of X bits, and the indication field is set to a state in which the transmission of aperiodic CSI is triggered, receiving the aperiodic CSI on the PUSCH scheduled by the DCI.

Optionally, the DCI is downlink DCI for scheduling downlink transmission.

The step of performing transmission based on the indication information in the DCI includes: if the downlink DCI triggers transmission of data, sending downlink data on a PDSCH scheduled by the downlink DCI; and if the downlink DCI does not trigger transmission of data, the DCI includes an aperiodic CSI indication field of X bits, and the indication field is set to a state in which the aperiodic CSI transmission is triggered, receiving the aperiodic CSI on a PUCCH scheduled by the downlink DCI.

According to the transmission method of the embodiment of the present disclosure, whether the DCI triggers the transmission of data is indicated by the indication information of N bits included in the DCI, so that the transmission end can learn, based on the indication information, whether the DCI triggers the transmission of data, thereby solving the problem that there is no specific method for distinguishing whether the DCI triggers the transmission of data in the 5G system.

Figure 3:
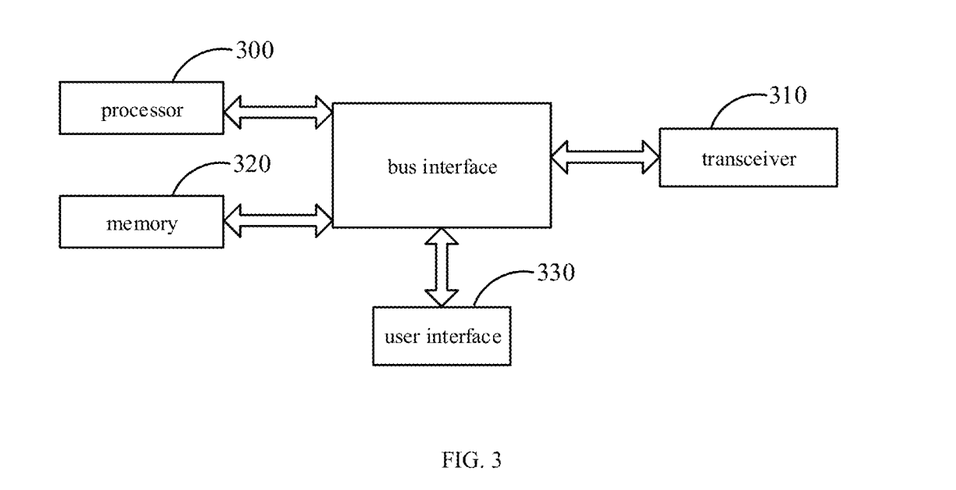
FIG. 3 is a block diagram of a UE according to some embodiments of the present disclosure.

As shown in FIG. 3, an embodiment of the present disclosure further provides a terminal including a transceiver, a memory, a processor, and a program stored on the memory and executed by the processor, so as to implement the following steps of receiving DCI by a transceiver, where the DCI includes indication information of N bits, the indication information of N bits is used to indicate whether the DCI triggers transmission of data, and N is an integer greater than or equal to 1; and performing transmission based on the indication information in the DCI.

In FIG. 3, the bus architecture may include any number of interconnected buses and bridges, specifically, the various circuits such as one or more processors represented by the processor 300 and the memory represented by the memory 320 are linked together. The bus architecture may also link various other circuits, such as peripherals, voltage regulators, and power management circuits, all of which are well known in the art and therefore will not be described further herein. The bus interface provides an interface. Transceiver 310 may be a plurality of elements, including a transmitter and a transceiver, providing units for communicating with various other devices on a transmission medium. For different user devices, the user interface 330 may also be an interface capable of internally and externally connecting a desired device, including, but not limited to, a keypad, a display, a speaker, a microphone, a joystick, and the like.

The processor 300 is used for managing the bus architecture and general processing, and the memory 320 may store data used by the processor 300 to perform operations.

Optionally, the DCI further includes an aperiodic CSI indication field of X bits, the aperiodic CSI indication field of X bits is used to indicate whether transmission of the aperiodic CSI is triggered, and X is an integer greater than or equal to 1.

Optionally, the situation that the aperiodic CSI indication field of X bits indicates that the transmission of the aperiodic CSI is not triggered and the situation that the indication information of N bits indicates that the transmission of the data is not triggered cannot coexist.

Optionally, N is 1.

Optionally, when the indication information of 1 bit is 0, it is used to indicate that transmission of data is not triggered, and when the indication information of 1 bit is 1, it is used to indicate that transmission of data is triggered.

Optionally, when the indication information of 1 bit is 0, it is used to indicate that transmission of data is triggered, and when the indication information of 1 bit is 1, it is used to indicate that transmission of data is not triggered.

Optionally, the DCI is uplink DCI for scheduling uplink transmission;

The processor 300 is further configured to read a program in the memory 320 and perform the following steps: if the uplink DCI triggers transmission of data, the uplink DCI includes an aperiodic CSI indication field of X bits, and the indication field is set to a state in which the aperiodic CSI transmission is not triggered, sending UL-SCH data information on a PUSCH scheduled by the uplink DCI by a transceiver; if the uplink DCI triggers transmission of data, the uplink DCI includes the aperiodic CSI indication field of X bits, and the indication field is set to a state in which transmission of aperiodic CSI is triggered, sending UL-SCH data information and aperiodic CSI on a PUSCH scheduled by the uplink DCI by using a transceiver; and if the uplink DCI does not trigger the transmission of data, the uplink DCI includes the aperiodic CSI indication field of X bits, and the indication field is set to a state in which the transmission of aperiodic CSI is triggered, the aperiodic CSI is transmitted by the transceiver on the PUSCH scheduled by the DCI.

Optionally, the DCI is downlink DCI for scheduling downlink transmission.

The processor 300 is further configured to read a program in the memory 320 and perform the following steps: if the downlink DCI triggers transmission of data, receiving downlink data on a PDSCH scheduled by the downlink DCI through a transceiver, and determining whether to report aperiodic CSI based on the aperiodic CSI indication field of X bits included in the DCI; if the downlink DCI does not trigger the transmission of data, the DCI includes an aperiodic CSI indication field of X bits, and the indication field is set to a state in which the transmission of the aperiodic CSI is triggered, sending the aperiodic CSI on a PUCCH scheduled by the downlink DCI by using a transceiver.

The processor 300 is further configured to read a program in the memory 320 and perform the following steps: if the aperiodic CSI indication field instructs to report the aperiodic CSI, reporting the aperiodic CSI and feedback information of the HARQ-ACK corresponding to the PDSCH scheduled by the downlink DCI.

In some embodiments of the present disclosure, there is also provided a computer readable storage medium having stored thereon a program that, when executed by a processor, performs the following steps: receiving DCI, wherein the DCI includes indication information of N bits, the indication information of N bits is used to indicate whether the DCI triggers transmission of data, and N is an integer greater than or equal to 1; and performing transmission based on the indication information in the DCI.

When the program is executed by the processor, all the implementations in the above-described transmission method applied to the terminal can be realized. To avoid repetition, details are not described herein.

Figure 4:
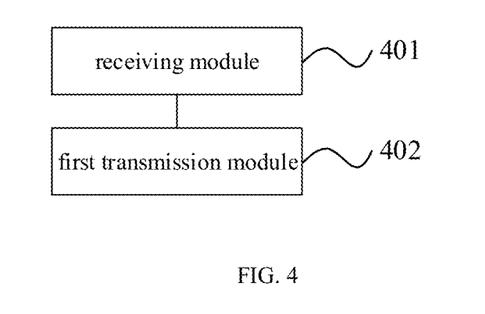
FIG. 4 is a schematic diagram of a UE according to some embodiments of the present disclosure.

As shown in FIG. 4, an embodiment of the present disclosure further provides a terminal including: a receiving module 401, configured to receive DCI, where the DCI includes indication information of N bits, the indication information of N bits is used to indicate whether transmission of data is triggered by the DCI, and N is an integer greater than or equal to 1; a first transmission module 402, configured to transmit based on the indication information in the DCI.

In the terminal according to the embodiment of the present disclosure, the DCI further includes an aperiodic CSI indication field of X bits, wherein the aperiodic CSI indication field of X bits is used to indicate whether transmission of the aperiodic CSI is triggered, and X is an integer greater than or equal to 1.

In the terminal according to an embodiment of the present disclosure, the situation that the aperiodic channel state information CSI indication field of the X bits indicates that the transmission of the aperiodic CSI is not triggered and the situation that the indication information of the N bits indicates that the transmission of the data is not triggered cannot coexist.

In the terminal of the disclosed embodiment, N is 1.

In the terminal according to an embodiment of the present disclosure, when indication information of 1 bit is 0, it indicates that transmission of data is not triggered, and when indication information of 1 bit is 1, it indicates that transmission of data is triggered.

Optionally, when the indication information of 1 bit is 0, it is used to indicate that transmission of data is triggered, and when the indication information of 1 bit is 1, it is used to indicate that transmission of data is not triggered.

In the terminal according to an embodiment of the present disclosure, the DCI is uplink DCI for scheduling uplink transmission.

The first transmission module 402 includes: a first transmission sub-module, configured to, if the uplink DCI triggers transmission of data, the uplink DCI includes the aperiodic CSI indication field of X bits, and the indication field is set to a state in which the aperiodic CSI transmission is not triggered, send UL-SCH data information on a PUSCH scheduled by the uplink DCI; a second transmission sub-module, configured to, if the uplink DCI triggers transmission of data, the uplink DCI includes the aperiodic CSI indication field of X bits, and the indication field is set to a state in which transmission of the aperiodic CSI is triggered, send UL-SCH data information and the aperiodic CSI on an PUSCH scheduled by the uplink DCI; and a third transmission sub-module, configured to, if the uplink DCI does not trigger transmission of data, the uplink DCI includes the aperiodic CSI indication field of X bits, and the indication field is set to a state in which the aperiodic CSI transmission is triggered, send the aperiodic CSI on the PUSCH scheduled by the DCI.

In the terminal according to an embodiment of the present disclosure, the DCI is downlink DCI scheduled for downlink transmission.

The first transmission module 402 includes: a fourth transmission sub-module, configured to: if the downlink DCI triggers transmission of data, receive downlink data on a PDSCH scheduled by the downlink DCI, and determine whether to report aperiodic CSI based on an aperiodic CSI indication field of X bits included in the DCI; and a fifth transmission sub-module, configured to, if the downlink DCI does not trigger transmission of data, the DCI includes an aperiodic CSI indication field of X bits, and the indication field is set to a state in which the aperiodic CSI transmission is triggered, send the aperiodic CSI on the PUCCH scheduled by the downlink DCI.

In the terminal according to an embodiment of the present disclosure, the fourth transmission sub-module is configured to, if the aperiodic CSI indication field instructs to report the aperiodic CSI, report the aperiodic CSI and feedback information of the HARQ corresponding to the PDSCH scheduled by the downlink DCI.

According to the terminal of the embodiment of the present disclosure, whether the DCI triggers the transmission of data is indicated by the indication information of N bits included in the DCI, so that the transmission end can learn, based on the indication information, whether the DCI triggers the transmission of data, thereby solving the problem that there is no specific method for distinguishing whether the DCI triggers the transmission of data in the 5G system.

Figure 5:
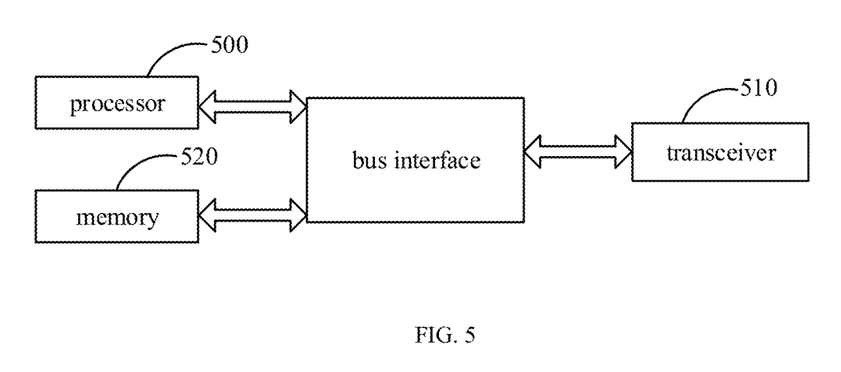
FIG. 5 is a block diagram of a base station according to some embodiments of the present disclosure.

As shown in FIG. 5, an embodiment of the present disclosure further provides a base station including a memory 520, a processor 500, a transceiver 510, a bus interface, and a program stored on the memory 520 and executed by the processor 500. The processor 500 is configured to read the program in the memory 520 and perform the following process: sending DCI through the transceiver, where the DCI includes indication information of N bits, where the indication information of N bits is used to indicate whether the DCI triggers transmission of data, and N is an integer greater than or equal to 1; and performing transmission based on the indication information in the DCI.

In FIG. 5, the bus architecture may include any number of interconnected buses and bridges, specifically, the various circuits such as one or more processors represented by the processor 500 and the memory represented by the memory 520 are linked together. The bus architecture may also link various other circuits, such as peripherals, voltage regulators, and power management circuits, all of which are well known in the art and therefore will not be described further herein. The bus interface provides an interface. Transceiver 510 may be a plurality of elements, including a transmitter and a transceiver, providing units for communicating with various other devices on a transmission medium. The processor 500 is responsible for managing the bus architecture and general processing, and the memory 520 may store data used by the processor 500 to perform operations.

Optionally, the DCI further includes an aperiodic CSI indication field of X bits, where the aperiodic CSI indication field of X bits is used to indicate whether transmission of the aperiodic CSI is triggered, and X is an integer greater than or equal to 1.

Optionally, the situation that the aperiodic CSI indication field of X bits indicates that the transmission of the aperiodic CSI is not triggered and the situation that the indication information of N bits indicates that the transmission of the data is not triggered cannot coexist.

Optionally, N is 1.

Optionally, when the indication information of 1 bit is 0, it is used to indicate that transmission of data is not triggered, and when the indication information of 1 bit is 1, it is used to indicate that transmission of data is triggered.

Optionally, when the indication information of 1 bit is 0, it is used to indicate that transmission of data is triggered, and when the indication information of 1 bit is 1, it is used to indicate that transmission of data is not triggered.

Optionally, the DCI is uplink DCI for scheduling uplink transmission.

The processor 500 may also perform the following steps when executing the program: if the uplink DCI triggers transmission of data, the uplink DCI includes an aperiodic CSI indication field of X bits, and the indication field is set to a state in which the aperiodic CSI transmission is not triggered, receiving UL-SCH data information on a PUSCH scheduled by the uplink DCI; if the uplink DCI triggers transmission of data, the uplink DCI includes the aperiodic CSI indication field of X bits, and the indication field is set to a state in which transmission of aperiodic CSI is triggered, receiving UL-SCH data information and aperiodic CSI on an PUSCH scheduled by the uplink DCI; and if the DCI does not trigger the transmission of data, the uplink DCI includes the aperiodic CSI indication field of X bits, and the indication field is set to a state in which the transmission of aperiodic CSI is triggered, receiving the aperiodic CSI on the PUSCH scheduled by the DCI.

Optionally, the DCI is downlink DCI for scheduling downlink transmission.

The processor 500 may also perform the following steps when executing the program: if the downlink DCI triggers transmission of data, sending downlink data on a PDSCH scheduled by the downlink DCI; and if the downlink DCI does not trigger transmission of data, the DCI includes an aperiodic CSI indication field of X bits, and the indication field is set to a state in which the aperiodic CSI transmission is triggered, receiving the aperiodic CSI on a PUCCH scheduled by the downlink DCI.

In some embodiments of the present disclosure, there is also provided a computer readable storage medium having stored thereon a program that, when executed by a processor, performs the following steps: sending DCI by a transceiver, wherein the DCI includes indication information of N bits, the indication information of N bits is used to indicate whether the DCI triggers transmission of data, and N is an integer greater than or equal to 1; and performing transmission based on the indication information in the DCI.

The program, when executed by the processor, can implement all the implementations of the above-described transmission method applied to the base station side. To avoid repetition, details are not described herein.

Figure 6:
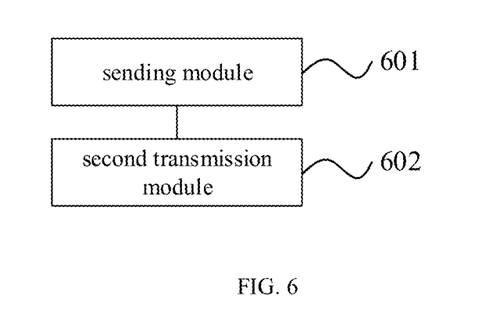
FIG. 6 is a schematic diagram of a base station according to some embodiments of the present disclosure.

As shown in FIG. 6, an embodiment of the present disclosure further provides a base station including: a sending module 601, configured to send DCI, where the DCI includes indication information of N bits, the indication information of N bits is used to indicate whether transmission of data is triggered by the DCI, and N is an integer greater than or equal to 1; a second transmission module 602, configured to transmit based on the indication information in the DCI.

According to the base station in the embodiment of the present disclosure, the DCI further includes an aperiodic CSI indication field of X bits, where the aperiodic CSI indication field of X bits is used to indicate whether transmission of the aperiodic CSI is triggered, and X is an integer greater than or equal to 1.

In the base station according to an embodiment of the present disclosure, the situation that the aperiodic CSI indication field of the X bits indicates that the transmission of the aperiodic CSI is not triggered and the situation that the indication information of the N bits indicates that the transmission of the data is not triggered cannot coexist.

In the base station according to an embodiment of the present disclosure, N is 1.

In the base station according to an embodiment of the present disclosure, when the indication information of 1 bit is 0, it indicates that transmission of data is not triggered and when indication information of 1 bit is 1, it indicates that transmission of data is triggered.

Optionally, when the indication information of 1 bit is 0, it is used to indicate that transmission of data is triggered, and when the indication information of 1 bit is 1, it is used to indicate that transmission of data has not been triggered.

In the base station according to an embodiment of the present disclosure, the DCI is uplink DCI for scheduling uplink transmission.

The second transmission module 602 includes: a sixth transmission sub-module, configured to, if the uplink DCI triggers transmission of data, the uplink DCI includes the aperiodic CSI indication field of X bits, and the indication field is set to a state in which the aperiodic CSI transmission is not triggered, receive UL-SCH data information on a PUSCH scheduled by the uplink DCI; a seventh transmission sub-module, configured to, if the uplink DCI triggers transmission of data, the uplink DCI includes the aperiodic CSI indication field of X bits, and the indication field is set to a state in which the transmission of the aperiodic CSI is triggered, receive UL-SCH data information and aperiodic CSI on an PUSCH scheduled by the uplink DCI; and an eighth transmission sub-module, configured to, if the DCI does not trigger transmission of data, the uplink DCI includes the aperiodic CSI indication field of X bits, and the indication field is set to a state in which the aperiodic CSI transmission is triggered, receive the aperiodic CSI on the PUSCH scheduled by the DCI.

In the base station according to an embodiment of the present disclosure, the DCI is downlink DCI for scheduling downlink transmission.

The second transmission module 602 includes: a ninth transmission sub-module configured to, if the transmission of the data is triggered by the downlink DCI, transmit downlink data on a PDSCH scheduled by the downlink DCI; and a tenth transmission sub-module, configured to, if the downlink DCI does not trigger transmission of data, the DCI includes an aperiodic CSI indication field of X bits, and the indication field is set to a state in which the aperiodic CSI transmission is triggered, receive the aperiodic CSI on the PUCCH scheduled by the downlink DCI.

According to the base station in the embodiment of the present disclosure, whether the DCI triggers the transmission of data is indicated by the indication information of N bits included in the DCI, so that the transmission end can learn, based on the indication information, whether the DCI triggers the transmission of data, thereby solving the problem that there is no specific method for distinguishing whether the DCI triggers the transmission of data in the 5G system.

In the various embodiments of the present disclosure, it is to be understood that the sequence numbers of the processes described above is not intended to mean the order of execution, and that the order of execution of the processes should be determined by their function and intrinsic logic, and should not constitute any limitation on the implementation of the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method, performed by a terminal, comprising:
    receiving downlink control information (DCI), wherein the DCI comprises indication information of N bits, the indication information of N bits is used to indicate whether the DCI triggers transmission of physical uplink shared channel with uplink shared channel (UL-SCH) data, and N is an integer greater than or equal to 1; and
    performing transmission based on the indication information in the DCI;
    wherein N is 1,
    when the indication information of 1 bit is 0, it indicates that the transmission of the UL-SCH data is not triggered, and when the indication information of 1 bit is 1, it indicates that the transmission of the UL-SCH data is triggered; or
    when the indication information of 1 bit is 0, it indicates that transmission of UL-SCH data is triggered, and when the indication information of 1 bit is 1, it indicates that transmission of UL-SCH data is not triggered;

wherein the DCI further comprises an aperiodic channel state information (CSI) indication field of X bits, the aperiodic CSI indication field of X bits is used to indicate whether transmission of the aperiodic CSI is triggered, and X is an integer greater than or equal to 1;

wherein a situation that the aperiodic CSI indication field of X bits indicates that the transmission of the aperiodic CSI is not triggered and a situation that the indication information of N bits indicates that the transmission of the UL-SCH data is not triggered cannot coexist.

2. The transmission method according to claim 1, wherein the DCI is uplink DCI for scheduling uplink transmission;

the step of performing transmission based on the indication information in the DCI comprises:

when the uplink DCI triggers the transmission of UL-SCH data, the uplink DCI comprises an aperiodic CSI indication field of X bits, and the aperiodic CSI indication field is set to a state in which transmission of aperiodic CSI is not triggered, sending uplink shared channel (UL-SCH) data information on a physical uplink shared channel (PUSCH) scheduled by the uplink DCI;

when the uplink DCI triggers the transmission of UL-SCH data, the uplink DCI includes the aperiodic CSI indication field of X bits, and the aperiodic CSI indication field is set to a state in which the transmission of aperiodic CSI is triggered, sending UL-SCH data information and aperiodic CSI on the PUSCH scheduled by the uplink DCI; and when the uplink DCI does not trigger the transmission of UL-SCH data, the uplink DCI includes the aperiodic CSI indication field of X bits, and the aperiodic CSI indication field is set to a state in which the transmission of aperiodic CSI is triggered, sending the aperiodic CSI on the PUSCH scheduled by the DCI.

3. The transmission method according to claim 1, wherein the DCI is downlink DCI for scheduling downlink transmission;

the step of performing transmission based on the indication information in the DCI comprises:

when the downlink DCI triggers the transmission of downlink data, receiving downlink data on a physical downlink shared channel (PDSCH) scheduled by the downlink DCI, and determining whether to report aperiodic CSI based on an aperiodic CSI indication field of X bits included in the DCI; and when the downlink DCI does not trigger the transmission of downlink data, the DCI includes an aperiodic CSI indication field of X bits, and the aperiodic CSI indication field is set to a state in which the transmission of aperiodic CSI is triggered, sending the aperiodic CSI on a physical uplink control channel (PUCCH) scheduled by the downlink DCI.

4. The transmission method according to claim 3, wherein the step of determining whether to report aperiodic CSI based on an aperiodic CSI indication field of X bits included in the DCI comprises:

when the aperiodic CSI indication field instructs to report the aperiodic CSI, reporting the aperiodic CSI and feedback information of a hybrid automatic repeat request (HARQ) corresponding to the PDSCH scheduled by the downlink DCI.

5. A transmission method, performed by a base station, comprising:

sending downlink control information (DCI), wherein the DCI comprises indication information of N bits, the indication information of N bits is used to indicate whether the DCI triggers transmission of physical uplink shared channel with uplink shared channel (UL-SCH) data, and N is an integer greater than or equal to 1; and performing transmission based on the indication information in the DCI;

wherein N is 1, when the indication information of 1 bit is 0, it indicates that the transmission of the UL-SCH data is not triggered, and when the indication information of 1 bit is 1, it indicates that the transmission of the UL-SCH data is triggered; or when the indication information of 1 bit is 0, it indicates that transmission of UL-SCH data is triggered, and when the indication information of 1 bit is 1, it indicates that transmission of UL-SCH data is not triggered;

wherein the DCI further comprises an aperiodic channel state information (CSI) indication field of X bits, the aperiodic CSI indication field of X bits is used to indicate whether transmission of the aperiodic CSI is triggered, and X is an integer greater than or equal to 1;

wherein a situation that the aperiodic CSI indication field of X bits indicates that the transmission of the aperiodic CSI is not triggered and a situation that the indication information of N bits indicates that the transmission of the UL-SCH data is not triggered cannot coexist.

6. The transmission method according to claim 5, wherein the DCI is uplink DCI for scheduling uplink transmission;

the step of performing transmission based on the indication information in the DCI comprises:

when the uplink DCI triggers the transmission of UL-SCH data, the uplink DCI comprises an aperiodic CSI indication field of X bits, and the aperiodic CSI indication field is set to a state in which transmission of aperiodic CSI is not triggered, receiving uplink shared channel (UL-SCH) data information on a physical uplink shared channel (PUSCH) scheduled by the uplink DCI;

when the uplink DCI triggers the transmission of UL-SCH data, the uplink DCI includes the aperiodic CSI indication field of X bits, and the aperiodic CSI indication field is set to a state in which the transmission of aperiodic CSI is triggered, receiving UL-SCH data information and aperiodic CSI on the PUSCH scheduled by the uplink DCI; and when the uplink DCI does not trigger the transmission of UL-SCH data, the uplink DCI includes the aperiodic CSI indication field of X bits, and the aperiodic CSI indication field is set to a state in which the transmission of aperiodic CSI is triggered, receiving the aperiodic CSI on the PUSCH scheduled by the DCI.

7. The transmission method according to claim 5, wherein the DCI is downlink DCI for scheduling downlink transmission;

the step of performing transmission based on the indication information in the DCI comprises:

when the downlink DCI triggers the transmission of downlink data, sending downlink data on a physical downlink shared channel (PDSCH) scheduled by the downlink DCI; and when the downlink DCI does not trigger the transmission of downlink data, the DCI includes an aperiodic CSI indication field of X bits, and the aperiodic CSI indication field is set to a state in which the transmission of aperiodic CSI is triggered, receiving the aperiodic CSI on a physical uplink control channel (PUCCH) scheduled by the downlink DCI.

8. A base station comprising a transceiver, a memory, a processor, and a program stored on the memory and executed by the processor, when executing the program, the processor implements the transmission method according to claim 5.

9. A terminal comprising a transceiver, a memory, a processor, and a program stored on the memory and executed by the processor, to implement the steps of:
receiving downlink control information (DCI) by the transceiver, wherein the DCI comprises indication information of N bits, the indication information of N bits is used to indicate whether the DCI triggers transmission of physical uplink shared channel with uplink shared channel (UL-SCH) data, and N is an integer greater than or equal to 1; and
performing transmission based on the indication information in the DCI;
wherein N is 1,
when the indication information of 1 bit is 0, it indicates that the transmission of the UL-SCH data is not triggered, and when the indication information of 1 bit is 1, it indicates that the transmission of the UL-SCH data is triggered; or
when the indication information of 1 bit is 0, it indicates that transmission of UL-SCH data is triggered, and when the indication information of 1 bit is 1, it indicates that transmission of UL-SCH data is not triggered;
wherein the DCI further comprises an aperiodic channel state information (CSI) indication field of X bits, the aperiodic CSI indication field of X bits is used to indicate whether transmission of the aperiodic CSI is triggered, and X is an integer greater than or equal to 1;
wherein a situation that the aperiodic CSI indication field of X bits indicates that the transmission of the aperiodic CSI is not triggered and a situation that the indication information of N bits indicates that the transmission of the UL-SCH data is not triggered cannot coexist.

* * * * *